Sept. 23, 1958 E. S. McVEY 2,853,633

VOLTAGE COMPARISON TRANSISTOR CIRCUIT

Filed Jan. 14, 1957

INVENTOR.
EUGENE S. McVEY
BY [signature]
H. H. Losche
ATTORNEYS

United States Patent Office 2,853,633

Patented Sept. 23, 1958

2,853,633

VOLTAGE COMPARISON TRANSISTOR CIRCUIT

Eugene S. McVey, Fort Wayne, Ind.

Application January 14, 1957, Serial No. 634,129

7 Claims. (Cl. 307—88.5)

(Granted under Title 35, U. S. Code (1952), sec. 266)

The invention described herein may be manufactured and used by or for the Government of the United States of America for government purposes without the payment of any royalties thereon or therefor.

This invention relates to voltage comparison circuits and more particularly to a transistor voltage comparison circuit for comparing two voltages, one of which is variable and the other a direct current voltage.

A number of successfully operated voltage comparison circuits have been made and used utilizing vacuum tubes. While many of such circuits using vacuum tubes are in use, these circuits are only reliable to the extent of the vaccum tubes and are bulky and are of considerable weight, which are objectionable for electronic equipment where space is at a premium and weight is kept at an absolute minimum, as in aircraft or the like.

In the present invention a voltage comparison circuit is provided utilizing transistors which are exceedingly small in comparison with vacuum tubes, whereby a very small, compact, and light weight circuit component is produced that is very reliable in comparison with the prior known voltage comparison circuits. It is therefore a general object of this invention to provide a voltage comparison transistor circuit for continuously comparing variable and direct current voltages, which transistor circuit is light in weight and very compact.

These and other objects, advantages, features, and uses will become more apparent when considered along with the schematic circuit diagrams illustrated in the accompanying drawing, in which.

Figure 1:
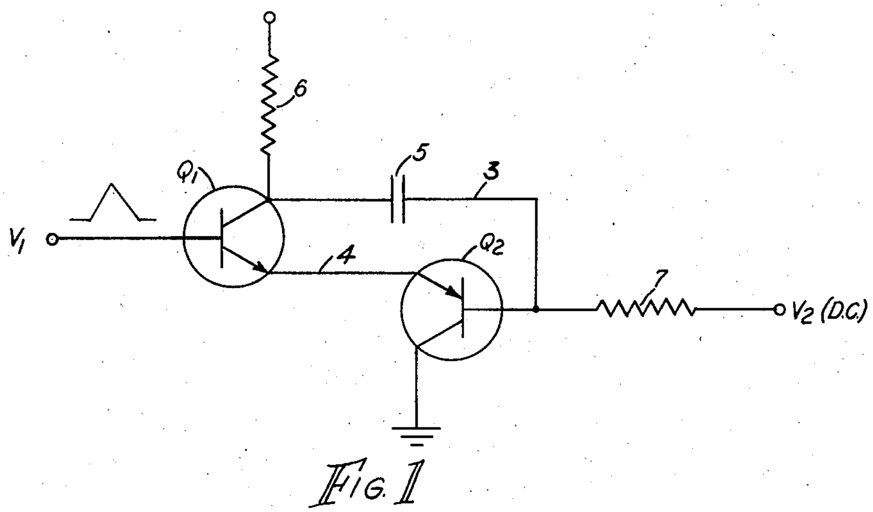
Figure 1 is a circuit schematic diagram of one embodiment of the invention.

Referring more particularly to Figure 1 of the drawing, there is shown two transistors, $Q_1$ and $Q_2$, $Q_1$ being of the N-P-N type and $Q_2$ being of the P-N-P type. These transistors are of the conventional three electrode type in which each has a base, collector, and emitter. $Q_1$ and $Q_2$ are directly emitter coupled by conductor 4, and the collector of transistor $Q_2$ is connected directly to ground. The collector of transistor $Q_1$ is coupled through a capacitor 5 to the base of transistor $Q_2$ via the conductor 3. The collector of transistor $Q_1$ is also coupled to a positive direct current (D. C.) voltage supply source through a current limiting resistor 6. The base of the transistor $Q_2$ is also coupled through a current limiting resistor 7 to a D. C. reference voltage source $V_2$. The variable voltage $V_1$ to be compared with $V_2$ is connected directly to the base of transistor $Q_1$.

In the operation of this transistor voltage comparison circuit, as illustrated in the drawing, whenever the variable voltage to be compared, $V_1$, is equal to or less than the reference voltage $V_2$, the transistors $Q_1$ and $Q_2$ will be in a quiescent state of low current for the reason that the emitter-base diodes of $Q_1$ and $Q_2$ are biased in the reverse direction when $V_1$ is greater than $V_2$ by reason of the emitter coupling over the conductor 4. The emitter voltage of the transistor $Q_2$ follows the base voltage of this transistor when the emitter-base diode is biased in the forward direction since the collector is grounded. The rise of the variable voltage $V_1$ to any level greater than the reference voltage $V_2$ will cause the transistors $Q_1$ and $Q_2$ to begin conduction from the collector voltage source to ground, producing a drop in collector voltage of the transistor $Q_1$ toward ground potential. This negative-going voltage drop at the collector of $Q_1$ produces a negative pulse passed by the capacitor 5 to the base of the transistor $Q_2$, causing the emitter voltages of both $Q_1$ and $Q_2$ transistors to go negative. This increase in voltage differential between the emitter and base of transistor $Q_1$ produces still more conduction of the transistors $Q_1$ and $Q_2$ limited by the limiting resistor 6 until the variable voltage $V_1$ drops to a voltage level equal to that of the comparison voltage $V_2$, at which time the emitter-base diodes of $Q_1$ and $Q_2$ are again cut off. The collector voltage of $Q_1$ will drop almost instantly to the $Q_1$ base voltage as soon as the $V_1$ voltage exceeds the $V_2$ voltage. If the $V_1$ voltage continues to rise, the $Q_1$ collector voltage will rise. If the $V_1$ voltage does not continue to rise, the $Q_1$ collector voltage will tend to remain near $V_1$ voltage until $V_1$ voltage decreases. Indications of the voltage comparisons made by this circuit may be tapped from either the conductor 3 or conductor 4. In this manner a varying voltage such as $V_1$ can be continuously compared with a D. C. reference voltage $V_2$ of any predetermined level within the voltage limits applicable to the base of the transistor $Q_2$.

Figure 2:
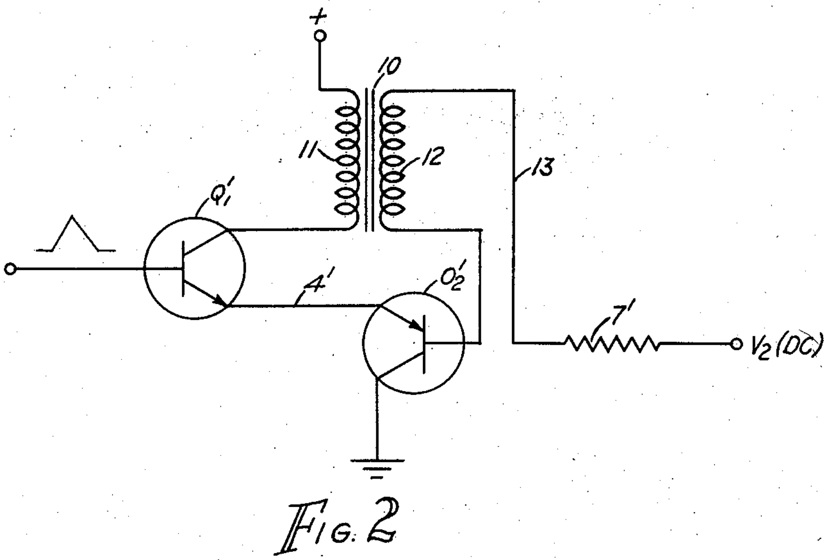
Figure 2 is a modification of the circuit of Figure 1.

In the modification shown in Figure 2, like parts of Figure 1 are identified by like reference characters primed. Figure 2 illustrates that the coupling of energy from the collector of transistor $Q_1'$ to the base of transistor $Q_2'$ may be by way of a transformer 10 instead of through a capacitor 5 as shown in Figure 1. The collector of $Q_1'$ is supplied collector voltage through one winding 11 of the transformer 10 and the base of $Q_2$ is coupled serially through the other winding 12 and the resistor 7' by way of the base conductor 13. The operation of the circuit of Figure 2 in comparing a reference D. C. voltage with a variable voltage is the same as explained for the operation of Figure 1.

While many modifications and changes may be made in the constructional circuit arrangement as illustrated in the two figures of the drawing, it is to be understood that the scope of my invention is limited only to the extent of the appended claims.

It is to be understood that P-N-P and N-P-N transistors may be used in any combination with supply circuit changes to provide a comparison circuit of the scope described.

I claim:

1. A voltage comparison transistor circuit comprising; a pair of transistors having the emitters thereof directly connected, one of which transistors is collector grounded; a feedback circuit means between the base of the collector grounded transistor and the collector of the other transistor; and means applying voltages to be compared to the bases of said pair of transistors.

2. A voltage comparison transistor circuit as set forth in claim 1 wherein said feedback circuit means is a coupling through a capacitor for passing pulses.

3. A voltage comparison transistor circuit as set forth in claim 1 wherein said feedback circuit means is a coupling through a transformer.

4. A voltage comparison transistor circuit as set forth in claim 3 wherein said other transistor is a P-N-P type and the collector grounded transistor is an N-P-N type.

5. A voltage comparison transistor circuit as set forth in claim 1 wherein said feedback circuit means is a coupling through a capacitor, said collector grounded transistor being of the P-N-P type and said other transistor being of the N-P-N type.

6. A voltage comparison transistor circuit comprising; a pair of transistors emitter coupled in a complementary manner, one of which is collector grounded; a feedback circuit through a capacitor from the base of the collector grounded transistor to the collector of the other transistor; means applying a voltage to the collector of said other transistor; and two voltages to be compared coupled, respectively, one each to the base of each transistor whereby comparison of the two voltages is determined by conduction of said pair of transistors.

7. A voltage comparison transistor circuit as set forth in claim 6 wherein said means applying a voltage to the collector of said other transistor and the voltage applied to the base of said collector grounded transistor are each through a current limiting resistor.

References Cited in the file of this patent

UNITED STATES PATENTS

| | | |
|---|---|---|
| 2,693,568 | Chase | Nov. 2, 1954 |
| 2,698,416 | Sherr | Dec. 28, 1954 |